US010795777B1

(12) United States Patent
Goyal

(10) Patent No.: US 10,795,777 B1
(45) Date of Patent: Oct. 6, 2020

(54) CONTINUOUS VERIFIED BACKUPS

(71) Applicant: Amazon Technologies, Inc., Seattle, WA (US)

(72) Inventor: Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 306 days.

(21) Appl. No.: 15/889,103

(22) Filed: Feb. 5, 2018

Related U.S. Application Data

(60) Provisional application No. 62/590,213, filed on Nov. 22, 2017.

(51) Int. Cl.
G06F 16/00 (2019.01)
G06F 11/14 (2006.01)
G06F 16/27 (2019.01)
G06F 16/21 (2019.01)
G06F 16/25 (2019.01)
G06F 16/23 (2019.01)

(52) U.S. Cl.
CPC ........ *G06F 11/1464* (2013.01); *G06F 16/219* (2019.01); *G06F 16/2358* (2019.01); *G06F 16/2365* (2019.01); *G06F 16/258* (2019.01); *G06F 16/27* (2019.01); *G06F 2201/84* (2013.01)

(58) Field of Classification Search
CPC .. G06F 16/219; G06F 16/258; G06F 16/2358; G06F 16/2365; G06F 16/2474; G06F 16/2477; G06F 16/27; G06F 16/275; G06F 16/162; G06F 11/1448; G06F 11/1451; G06F 11/08; G06F 11/0793; G06F 11/1464; G06F 2201/84; G06F 7/20; G06F 16/248; G06F 16/252; G06F 16/2455; G06F 16/221; G06F 16/25; G06F 16/24578; G06F 16/285; G06F 16/00; G06F 17/10; G06F 17/30; G06F 7/544; G06F 16/24535; G06F 16/24539; G06F 17/30451; G06Q 50/01
See application file for complete search history.

(56) References Cited

U.S. PATENT DOCUMENTS 7,921,267 B1 * 4/2011 Yadav ................. G06F 11/2082
711/162
8,788,773 B2 7/2014 Goodman et al.
(Continued)

*Primary Examiner* — Anh Ly
(74) *Attorney, Agent, or Firm* — Robert C. Kowert; Kowert, Hood, Munyon, Rankin & Goetzel, P.C.

(57) ABSTRACT

A system and technique for creating, in a non-native format, verified snapshots and change log archives for data in a database (e.g., tables, partitions, etc.). To verify accuracy of a conversion of the data and corresponding change log data from a native format to a non-native format, both data from the database and the corresponding change logs are processed separately with a forward transformation process, and then a reverse transformation process. The results of the reverse transformations are then compared to the original data to catch data corruptions or errors when performing the format conversion and creating the snapshot or change log archive so that the corruption or error is not propagated to the snapshot/archive. Various forms of error detection (e.g., byte-level, raw data comparisons, checksums, etc.) and error handling are disclosed. The verified snapshots and change log archives may be used to restore the database, for example.

20 Claims, 8 Drawing Sheets

(56) References Cited

U.S. PATENT DOCUMENTS

| | | | | |
|---|---|---|---|---|
| 8,966,382 B1* | 2/2015 | Yehuda | ............... | G06F 3/0484 |
| | | | | 715/762 |
| 9,020,903 B1* | 4/2015 | Vempati | ............... | G06F 12/121 |
| | | | | 707/674 |
| 9,558,078 B2 | 1/2017 | Farlee et al. | | |
| 10,235,090 B1* | 3/2019 | Baruch | ............... | G06F 11/3006 |
| 10,261,757 B2* | 4/2019 | Harrill | ............... | G06F 8/31 |
| 10,423,634 B1* | 9/2019 | Shemer | ............... | G06F 16/2358 |
| 2002/0156891 A1* | 10/2002 | Ulrich | ............... | G06F 9/5083 |
| | | | | 709/225 |
| 2010/0169592 A1* | 7/2010 | Atluri | ............... | G06F 11/1471 |
| | | | | 711/162 |
| 2011/0087874 A1* | 4/2011 | Timashev | ............... | G06F 11/1446 |
| | | | | 713/100 |
| 2013/0282662 A1* | 10/2013 | Kumarasamy | ............... | G06F 11/14 |
| | | | | 707/649 |
| 2014/0201151 A1* | 7/2014 | Kumarasamy | ............... | G06F 16/168 |
| | | | | 707/646 |
| 2015/0379062 A1* | 12/2015 | Vermeulen | ............... | G06F 16/2365 |
| | | | | 707/691 |
| 2016/0004721 A1* | 1/2016 | Iyer | ............... | G06F 16/128 |
| | | | | 707/649 |
| 2016/0132400 A1* | 5/2016 | Pawar | ............... | G06F 11/14 |
| | | | | 707/679 |
| 2016/0350391 A1* | 12/2016 | Vijayan | ............... | G06F 3/065 |

* cited by examiner ically in a shared resource pool.

CONTINUOUS VERIFIED BACKUPS

This application claims benefit of priority to U.S. Provisional Application Ser. No. 62/590,213, entitled "REACTIVE METHOD TO BUILD A LOGICAL BACKUP WITH VERIFICATION," filed Nov. 22, 2017, and which is incorporated herein by reference in its entirety.

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. For example, a database table may be split into two or more partitions, each of which may be replicated, and each replica may be stored on a different machine. Interaction between client applications and database servers typically includes read operations (read-only queries), write operations (to store data), and update operations that can be conceptualized using a read-modify-write workflow.

In order to be able to recover from the malicious or inadvertent deletion of tables (or of portions thereof) and/or from logical data corruption, database users may wish to back up their tables periodically or on demand. However, it can be difficult to back up tables that are stored in large databases in which the data for each table is distributed across multiple, independent partitions and replicated across multiple machines in an efficient and consistent manner.

Figure 1:
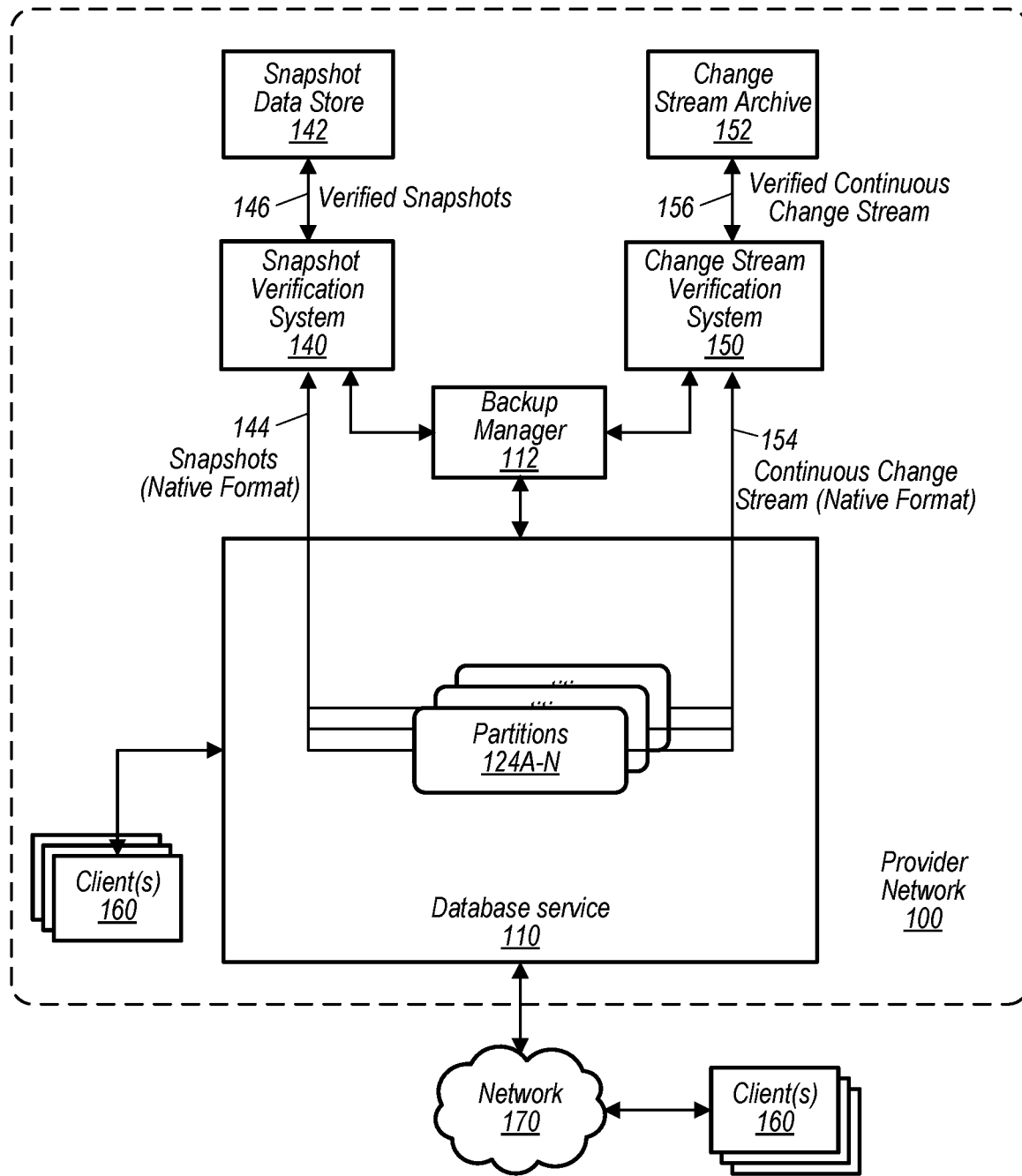
FIG. 1 is a block diagram illustrating a system for continuous verified backups, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed are systems and techniques for continuous verified backups. Some data systems include old data (e.g., customer data sitting on disks). Some systems include mechanisms for avoiding bit-rot and/or for avoiding the data going stale (e.g., the data remaining in a format that has gone out of use). Such mechanisms may require that the data is somehow "touched" in order trigger the features of the system that avoid bit-rot or avoid stale data (e.g., data may be checked against other copies and re-written, and/or updated to another format upon use such as exercised in a read/write code path).

In some systems, the data may have been obtained from the client and may have never been used or "exercised" in a read/write code path. In some such situations, the data in native format may not be valid (e.g., valid based on contractual agreements specifying such characteristics as limits on corruption in the byte format).

When backups of such data are generated, it can be desirable to catch bit-rot, stale data and corrupted data. However, there are challenges to implementing such techniques. For instance, for large scale systems, the solution must scale—solutions that require processing of petabytes of stored data (in native format) upfront do not scale well. Another problem to avoid is data transformation losses—it may be preferable to catch these in real-time, in embodiments. As indicated above, it is a preference that a backup technique be implemented to deal with cold data stored in a native format that may have been corrupted (e.g., because of the generations of software stack it has gone through). It may also be desirable to not impact real time customer traffic, and to sanitize the data during transformation as backups might be persisted indefinitely, in embodiments. One example of sanitizing the data includes exercising the data again and verifying that the data has been persisted correctly (e.g., another byte-specific data check).

Disclosed are embodiments of a system and technique for creating, in a non-native format, verified snapshots and verified change stream archives for data in a database (e.g., tables, partitions, etc.). To verify accuracy of a conversion of the data and corresponding change stream data from a native format to a non-native format, both data from the database and the corresponding change logs may be processed separately (periodically, and continuously, respectively, for example) with forward transformations, and then reverse transformations. The results of the reverse transformations (in the native format) may be compared to the original data (again, in the native format) to catch data corruptions or errors when performing the format conversion and creating the snapshot or change log archive so that the corruption or error is not propagated to the snapshot/archive. Various forms of error detection (e.g., byte-level, raw data comparisons, checksums, etc.) and error handling are disclosed. The verified snapshots and change log archives may be used to create point-in-time backups.

The systems and methods described herein may be employed in various combinations and in various embodiments to implement a network-based service that provides data storage services to storage service clients (e.g., user, subscribers, or client applications that access the data storage service on behalf of users or subscribers). The service may, in some embodiments, support the continuous verified backup of tables that are maintained on behalf of clients in a data store, e.g., a non-relational database or other type of database. The service may provide a high level of durability and availability through replication, in some embodiments. For example, in some embodiments, the data storage service may store data in multiple partitions (e.g., partitions that each contain a subset of the data in a table being maintained on behalf of a client), and may store multiple replicas of those partitions on respective storage devices or virtual storage volumes of different storage nodes.

In some embodiments, the data storage systems described herein may provide mechanisms for backing up a database table as a synchronous operation while the database continues to receive, accept, and service read and/or write operations that are directed to the table. In some embodiments, in response to a request to back up a table, the system may create a backup of each individual partition independently and (in some cases) in parallel (i.e., substantially concurrently). When a request to back up a table is received, the system may guarantee that all write operations that were directed to the table up to that point are included in the backup. However, the system may not guarantee that the backup operation produces a consistent view of the entire table (e.g., a consistent point-in-time snapshot of the table).

In some embodiments, backup operations may be initiated by data storage service users (e.g., customers, service subscriber, and/or client applications) using a "CreateBackup" application programming interface (API). In some embodiments, the systems described herein may support the scheduling of backups (e.g., every day at a particular time, or according to a published, but not necessarily periodic, schedule). In response to receiving a request to back up a table, these systems may back up each partition of the table as an individual item in a remote storage system (e.g., a key-value durable storage system), and may store metadata about the backup that is subsequently usable when restoring the backup to a new database (e.g., a new database table). In some embodiments, the system may be configured to initiate separate backup operations for each of the partitions of a table automatically (e.g., programmatically and without user intervention) in response to a request to back up the table, and to manage those backup operations on a per-partition basis (again, without user involvement).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In various embodiments, the systems described herein may store data in replicated partitions on multiple storage nodes (which may be located in multiple data centers) and may implement a single master failover protocol. For example, each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time.

As described herein, when a database table is created or restored from backup, various resources may be provisioned for the implementation of that table, including storage resources (e.g., disk capacity), and throughput capacity (which may, e.g., be specified in terms of input/output requests per second, or IOPS, for read operations and/or write operations). If the table is divided into two or more partitions (e.g., if various data items are stored on different ones of the partitions according to their primary key values), the provisioned resources may also be divided among the partitions. For example, if a database table is divided into two partitions, each partition may have access to half of the total amount of storage and/or throughput resources that are provisioned and/or committed for the implementation of the table.

In some embodiments of the distributed database systems described herein, each storage node may include multiple storage devices or logical volumes, each of which stores various partition replicas. For example, in one embodiment each storage node of the distributed database system may include five storage devices or logical storage volumes. In some embodiments, one or more mechanisms may be implemented on each of the storage nodes for determining, on a local level (e.g., on a storage node basis) whether and/or how to split a partition or move a partition (or a given replica of a partition), based on the current utilization of provisioned resources and/or other information. For example, one of the storage nodes may be configured to determine that a partition for which a replica is stored on one of its storage devices (e.g., disks) or logical storage volumes should be split into two new partition, and may divide the data in the partition by hash ranges, by key space ranges, or using other criteria to divide the data between the two new partitions. In another example, a storage node may be configured to determine that one or more partitions (or replicas thereof) should be moved from a given storage device or logical storage volume to another storage device or logical storage volume, e.g., in order to reduce the amount of provisioned storage capacity or throughput capacity on the given storage device or logical storage volume.

As noted above, from a user's perspective, a backup operation operates to create a backup of a whole table, but internally, the system may back up each partition of the table independently, such that consistency is guaranteed only up to a particular transaction or write operation on a per partition basis (rather than across the whole table). In some embodiments, the system may be configured to maintain metadata about the table (e.g., to keep track of the table schema, and the state of the world from the perspective of the table and of each partition). In some embodiments, this metadata may be stored in the data storage system itself, and a copy of the metadata may also be stored in the remote storage system into which tables are backed up.

FIG. 1 is a block diagram illustrating a system for continuous verified backups, according to some embodiments. Provider network 100 may be a private or closed system, in one embodiment, or may be set up by an entity such as a company or a public-sector organization to provide one or more services (such as various types of cloud-based storage) accessible via the Internet and/or other networks to clients 160, in another embodiment. In one embodiment, provider network 100 may be implemented in a single location or may include numerous data centers hosting various resource pools, such as collections of physical and/or virtualized computer servers, storage devices, networking equipment and the like (e.g., computing system 800 described below with regard to FIG. 8), needed to implement and distribute the infrastructure and storage services offered by the provider network 100. In one embodiment, provider network 100 may implement various computing resources or services, such as a database service 110 or other data processing (e.g., relational or non-relational (NoSQL) database query engines, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In some embodiments, the provider network 100 may include a backup manager 112 configured to handle or manage backups of databases that are stored with or maintained by the database service 110. The backups may be maintained by one or more data storage services. In some embodiments, the data storage services may include a snapshot data store 142 and a change log archive data store 152. The snapshot data store 142 may be configured to store complete backups of partitions of the database at a particular point-in-time. For example, a particular snapshot stored at the snapshot data store 142 may be generated at a particular point-in-time such that the data in the particular snapshot is at the state in which the database existed at that particular point-in-time. In the depicted embodiment, snapshot verification system 140 sends verified snapshots 146 to snapshot data store 142. In other embodiments, the database service 110 may be configured to store current or active data for the database such that data of the partition of the database is the most recent version of the data. The change log archive data store 152 may be configured to store logs indicating changes, mutations or events that occur with respect to the database or any data corresponding to the database managed by the database service 110.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes), in one embodiment, each of which may be similar to the computer system embodiment illustrated in FIG. 8 and described below. In one embodiment, the functionality of a given system or service component (e.g., a component of database service 110) may be implemented by a particular node or may be distributed across several nodes. In some embodiments, a given node may implement the functionality of more than one service system component (e.g., more than one data store component, such as snapshot data store 142 or change stream archive 152).

Database service 110 may include various types of database services, in one embodiment, (both relational and non-relational) for storing, querying, and updating data. Such services may be enterprise-class database systems that are highly scalable and extensible. In one embodiment, queries may be directed to a database in database service 110 that is distributed across multiple physical resources (e.g., computing nodes or database nodes), and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service 110 may also be any of various types of data processing services to perform different functions (e.g., query or other processing engines to perform functions such as anomaly detection, machine learning, data lookup, or any other type of data processing operation). Various other distributed processing architectures and techniques may be implemented by database service 110 (e.g., grid computing, sharding, distributed hashing, etc.) in another embodiment.

In one embodiment, clients 160 may encompass any type of client configurable to submit network-based requests to provider network 100 via network 170, including requests for database service 110 (e.g., to query a database managed by the database service 110) or data storage service(s) (e.g., a request to create, read, write, obtain, or modify data in data storage service(s), etc.). For example, in one embodiment a given client 160 may include a suitable version of a web browser, or may include a plug-in module or other type of code module configured to execute as an extension to or within an execution environment provided by a web browser. Alternatively, in a different embodiment, a client 160 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 160 may be an application configured to interact directly with provider network 100, in one embodiment. In one embodiment, client 160 may be configured to generate network-based services requests according to a Representational State Transfer (REST)-style network-based services architecture, a document- or message-based network-based services architecture, or another suitable network-based services architecture.

In one embodiment, a client 160 may be configured to provide access to provider network 100 to other applications in a manner that is transparent to those applications. For example, client 160 may be configured to integrate with a database on database service 110. In such an embodiment, applications may not need to be modified to make use of the storage system service model. Instead, the details of interfacing to the database service 110 may be coordinated by client 160.

The clients 160 may communicate with the database service 110 from within the provider network 100, in some embodiments. For example, the clients 160 may be implemented on computing nodes of a computing service offered by the provider network 100. The clients 160 may convey network-based services requests to and receive responses from provider network 100 via network 170, in one embodiment. In one embodiment, network 170 may encompass any suitable combination of networking hardware and protocols necessary to establish network-based-based communications between clients 160 and provider network 100. For example, network 170 may encompass the various telecommunications networks and service providers that collectively implement the Internet. In one embodiment, network 170 may also include private networks such as local area networks (LANs) or wide area networks (WANs) as well as public or private wireless networks. For example, both a given client 160 and a provider network 100 may be respectively provisioned within enterprises having their own internal networks. In such an embodiment, network 170 may include the hardware (e.g., modems, routers, switches, load balancers, proxy servers, etc.) and software (e.g., protocol stacks, accounting software, firewall/security software, etc.) necessary to establish a networking link between given client 160 and the Internet as well as between the Internet and provider network 100. It is noted that in one embodiment, clients 160 may communicate with provider network 100 using a private network rather than the public Internet.

The clients 160 may send a request to perform an operation to respective databases managed by the database service 110. For example, a given client 160 may send a PUT (or SET) command and corresponding data to request that the data be stored in the database at the data service 110. In another example, a given client 160 may send a CHANGE (or UPDATE) command and corresponding data to request that some data existing in the database at the database service 110 be changed based on the sent data. In yet another example, a given client 160 may send a DELETE (or REMOVE) command and identify data to request that the data existing in the database at the database service 110 be deleted or removed from the database and the database service 110. In other embodiments, a given client 160 may provide another command to perform some operation to the data stored in the database at the database service 110.

The database service 110 may be configured to maintain a backup system for partitions of databases managed by the database service 110. In some embodiments, the backup system may perform backups for single partitions of the databases or single partition databases. In other embodiments, the backup system may perform backups for multiple partitions of the databases. The backup system may include a backup manager 112 configured to generate and manage backups or snapshots of partitions of the databases stored at in storage services of the database service 110. The backup manager 112 may generate a complete backup of a partition of the database (e.g., a snapshot) by saving a complete copy of the partition of the database to the snapshot data store 142. In some embodiments, the backup manager 112 may request a full snapshot from the database service 110. The snapshot may have parity with the partition of the database as it exists in the database service 110 at a respective time of creation. For example, at time T0 when the snapshot is generated, the snapshot may be a complete or full copy of the partition of the database, such that the snapshot represents the state of the partition of the database at time T0. As an example, at a later time T1, the snapshot may be out-of-date based on one or more changes to the database resulting from one or more events at the database service 110. In some embodiments, the database service may have a high workload or otherwise be delayed in fulfilling the request for the full snapshot. Thus, the backup manager 112 may defer to a log-based snapshot as an alternative method to generate the full snapshot when the database service is determined to be unable to fulfill the request.

A change log may indicate the one or more changes to the database over a period of time or sequence of events. For example, the change log may indicate that data was added, changed or deleted from the database in a period of time. The change log may be stored at a log store (e.g., change log stream store 604 in FIG. 6, described below). The log store may be accessible to the database service 110 and the backup manager 112. In some embodiments, the database service 110 may generate or update a log segment in response to an event at the database. For example, the database service 110 may indicate in the log segment that the event occurred, and some data in the database has changed. The log segment may include metadata indicating a sequence start identifier, a sequence end identifier, a time start identifier, a time end identifier, one or more checksums, a previous cumulative size of the change log, a lineage of the log segment, or any combination thereof. The sequence start identifier may indicate a sequence number for a first event in a sequence of events that is logged in the log segment. The sequence end identifier may indicate a sequence number for a last event in the sequence of events that is logged in the log segment. The time start identifier may indicate a timestamp for the first event in the sequence of events that is logged in the log segment. The time end identifier may indicate a timestamp for the last event in the sequence of events that is logged in the log segment. The one or more checksums may correspond to the data in the partition of the database, the log segment, etc. The one or more checksums may be used by the backup manager 112 or the database service 110 to determine whether application of at least a portion of the log segment or the change log to the database has resulted in the correct data being restored or retrieved. The previous cumulative size of the change log may indicate a size of the change log prior to the respective log segment. The lineage of the log segment may indicate parent or child partitions associated with the log segment.

The log segment may be added to the change log in response to satisfying one or more criteria. In some embodiments, the log segment may be added to the change log based on a determination that the log segment satisfies a size threshold. For example, the database service 110 may add events to the log segment continuously until the log segment reaches a specified size or a size limit. After the log segment is the specified size, the log segment may be committed to the change log. In other embodiments, the log segment may be added to the change log based on a determination that a number of operations tracked or identified in the log segment satisfies a threshold number of operations. For example, the database service 110 may perform multiple CHANGE operations to the database. The multiple CHANGE operations on a data entry may require a higher amount of storage space in the log segment despite the storage space used by the data entry has not significantly increased. The database service 110 may track a number of operations and corresponding types and save the number of operations and corresponding types to the log segment.

The database service 110 may receive an indication that an event has occurred with a partition of a given database managed by the database service 110. In some embodiments, the event may be based on a request to perform an operation sent from a given client 160 to the database service 110. For example, the event may be based on a PUT command, a CHANGE command, a DELETE command or any other type of request from the given client 160. The event may also indicate a type of the operation, such as PUT, CHANGE, DELETE, etc. The event may also indicate data that used to perform the operation. For example, the indicated data may include new data to be stored with the PUT command, changed data to be updated with the CHANGE command, data to be deleted with the DELETE command.

The clients 160 may send a request to the database service 110 to generate a backup of a partition of a database. The database service 110 may also implement timed, periodic backups automatically or after scheduling by the clients 160. In some embodiments, a backup of the partition the database (e.g., a snapshot) may be generated at least in part by the backup manager 112. The backup manager 112 may have access to the database stored at the database service 110, the snapshot data store 142 and the change stream archive 152.

In an example, the backup manager 112 may determine that the snapshot type is a log-based snapshot. The backup manager 112 may generate data that indicates a point in the change log that, when used in conjunction with a stored snapshot, may be used to represent a snapshot of the partition of the database. The backup manager 112 may store the generated data as metadata in the snapshot data store 142.

In some embodiments, the log-based snapshot may be used to generate a full snapshot based on applying at least a portion the change log to a stored snapshot. The log-based snapshot may indicate the portion of the change log that may include logged events that have occurred since generation of the stored snapshot through the current time. The backup manager 112 may retrieve the stored snapshot from the snapshot data store 142, such as by sending a request to the snapshot data store 142 for the previous snapshot. The backup manager 112 may retrieve the change log from the change stream archive 152, such as by sending a request to the change stream archive 152 for the change log. The backup manager 112 may be configured to apply the change log to the stored snapshot. In some embodiments, applying the change log to the stored snapshot includes starting with the stored snapshot and stepping through the change log and reenacting events included in the change log in chronological order to the stored snapshot. In other embodiments, applying the change log to the stored snapshot includes starting with the stored snapshot and stepping through the change log and undoing events included in the change log in reverse chronological order.

In at least the embodiment illustrated in FIG. 1, the system may instruct components of the system to convert partition data in a native format to a preferred format (e.g., a binary and text interchangeable format, a typed JSON-superset, etc.) and then persist the preferred format to backup storage distinct from the source storage system. In embodiments, the conversion is performed in conjunction with a reverse conversion and then the results of the reverse conversion are compared with the raw bytes of the on disk native format to check for a match (e.g., for a perfect match, in some embodiments). In some embodiments, the comparison may be of a serialized persistent data storage format of the reverse conversion to the raw bytes of the on disk native format.

A match may indicate no data loss, for example. In embodiments, the conversion from the service or native format is not done directly into the preferred format. In some embodiments the native format is converted to an intermediate model (e.g., a Java data type) first and then serialized into the preferred format for storage or transport.

Figure 3:
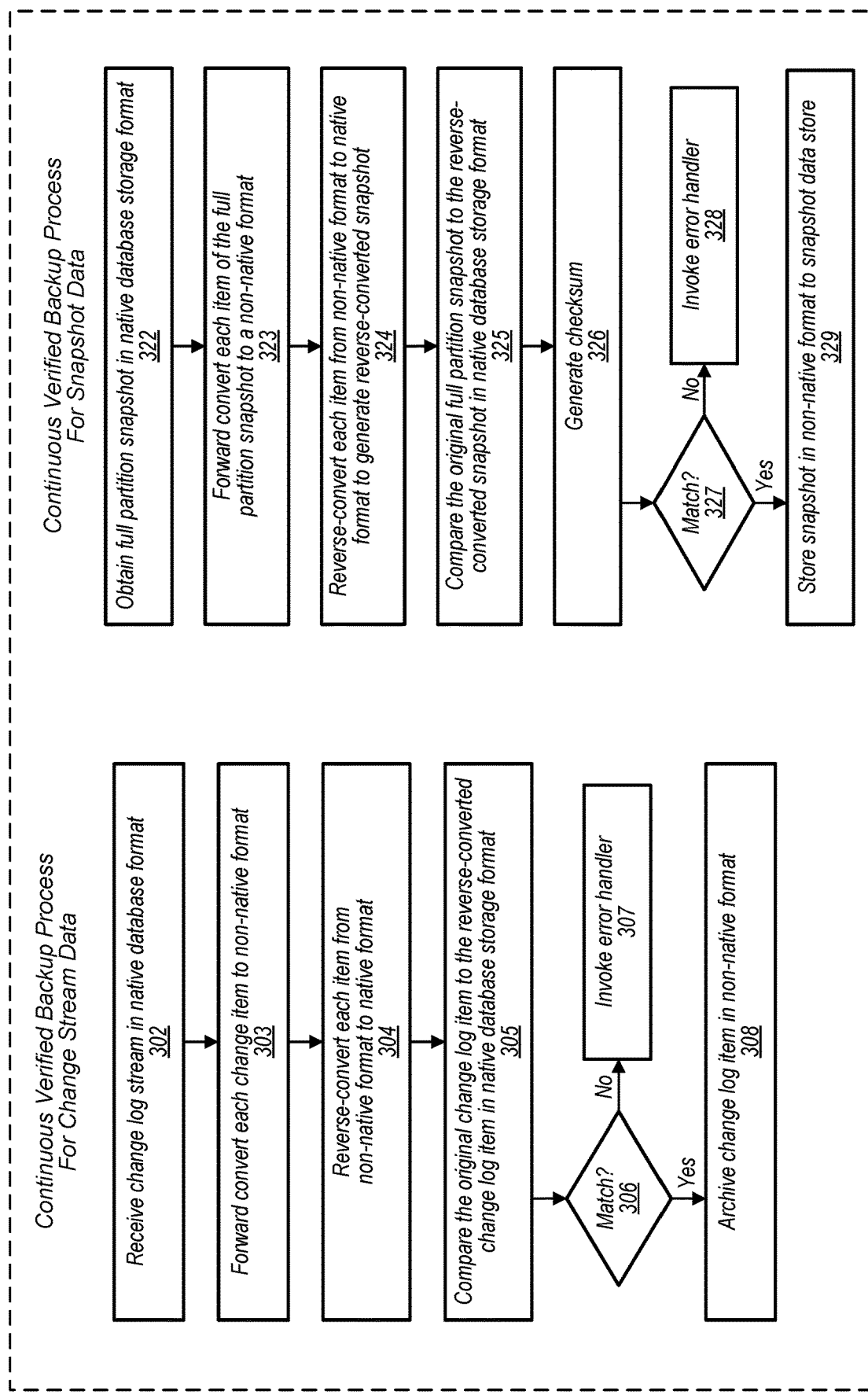
FIG. 3 is a flow chart illustrating two techniques used for a process of continuous verified backups, according to some embodiments.
Figure 4:
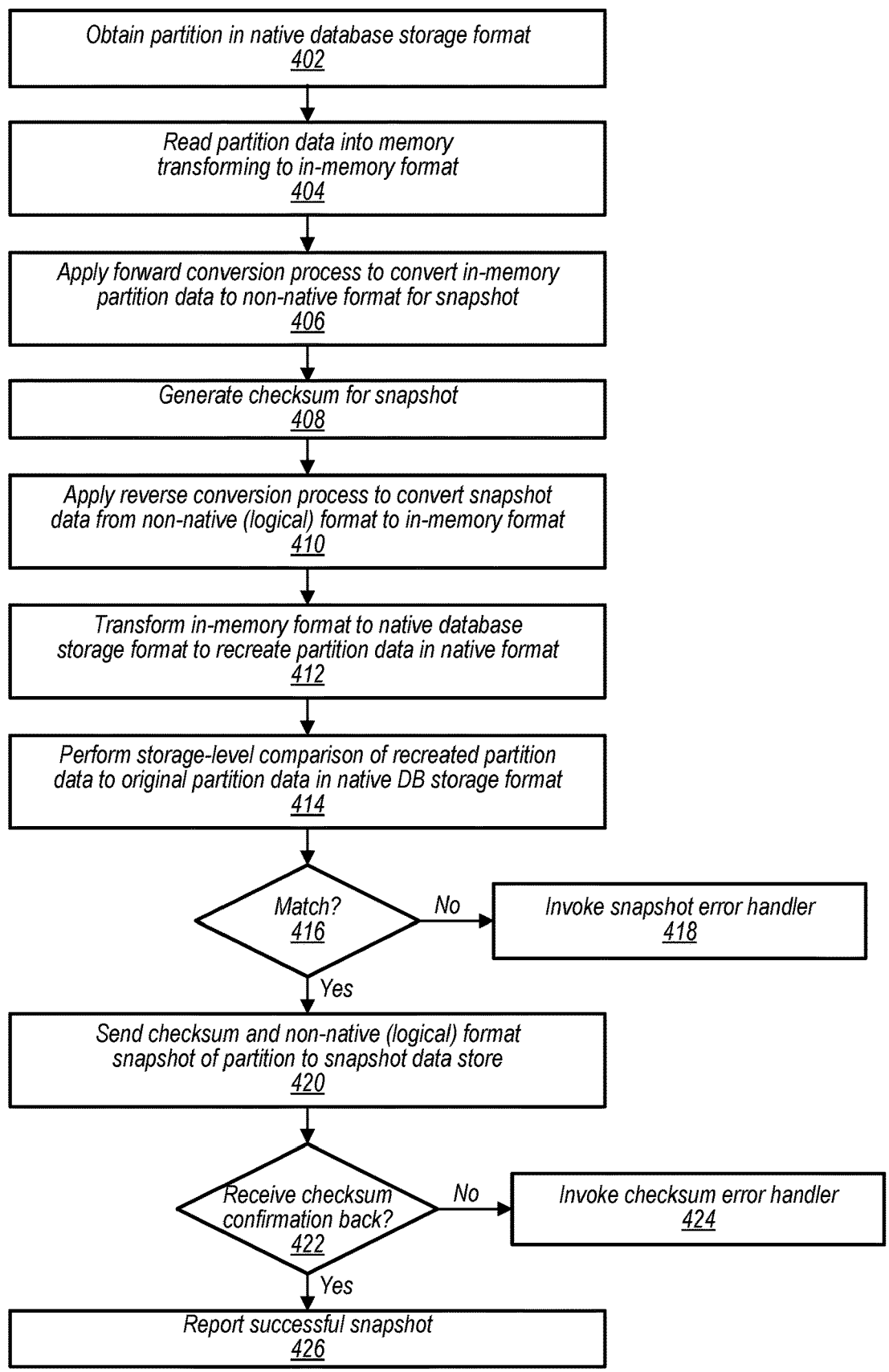
FIG. 4 is a flow chart illustrating a technique for continuous verified backups (e.g., for data in a database) according to some embodiments.

For example, snapshot verification system 140 may perform a forward conversion process (e.g., a process similar to that illustrated in block 323 in FIG. 3 and block 406 of FIG. 4) and a reverse conversion process (e.g., a process similar to that illustrated in block 324 in FIG. 3 and block 410 of FIG. 4), as well as a comparison of the results (e.g., a process similar to that illustrated in block 325 in FIG. 3 and block 414 of FIG. 4).

Figure 5:
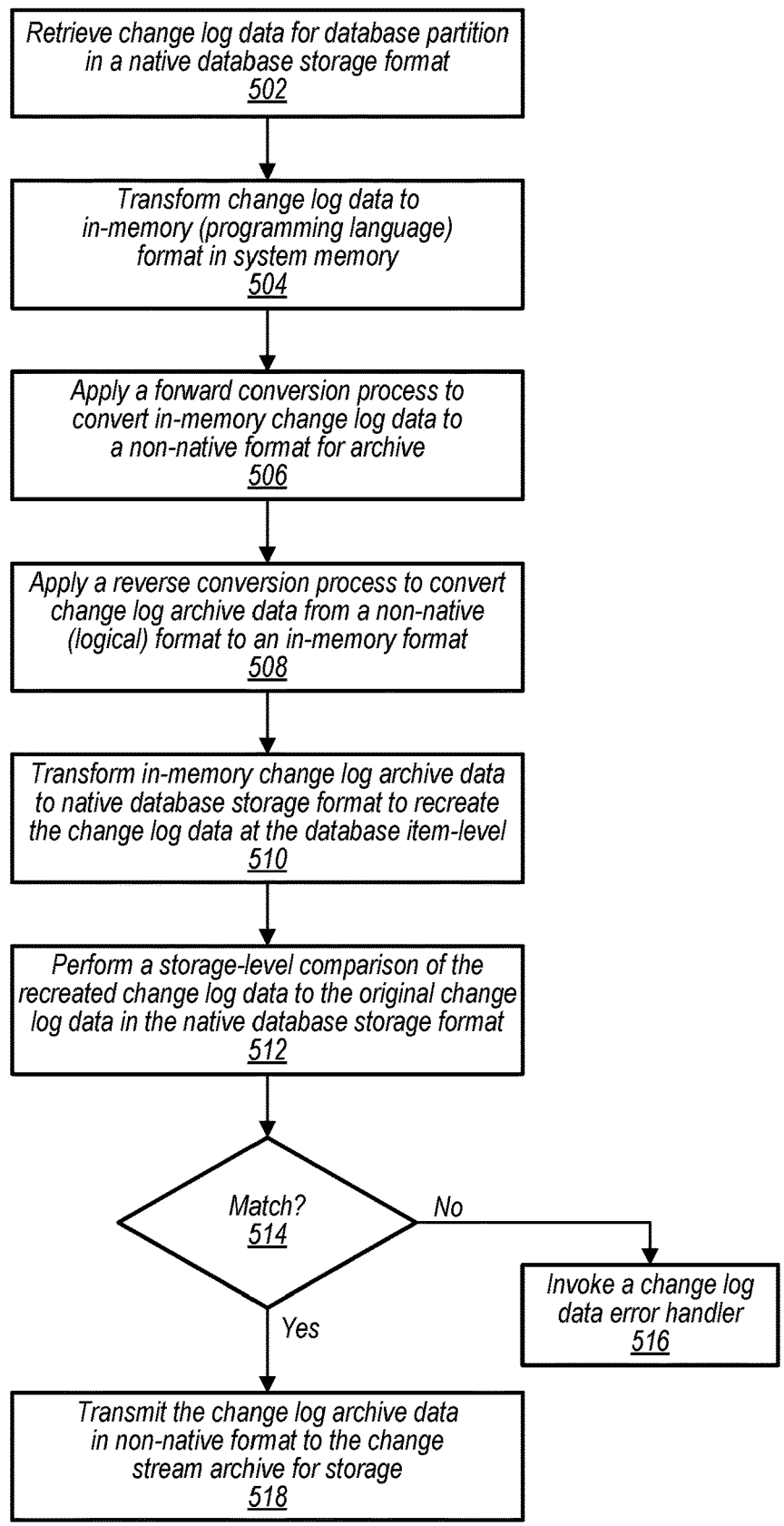
FIG. 5 is a flow chart illustrating a technique for continuous verified backup (for a change log corresponding to the database data) according to some embodiments.

Similarly, change stream verification system 150 may perform a forward conversion process (e.g., a process similar to that illustrated in block 303 in FIG. 3 and block 506 of FIG. 5) and a reverse conversion process (e.g., a process similar to that illustrated in block 304 in FIG. 3 and block 508 of FIG. 5), as well as a comparison of the results (e.g., a process similar to that illustrated in block 305 in FIG. 3 and block 512 of FIG. 5). In at least the illustrated embodiment, change stream verification system 150 sends verified continuous change stream data 156 to change stream archive 152.

Figure 2:
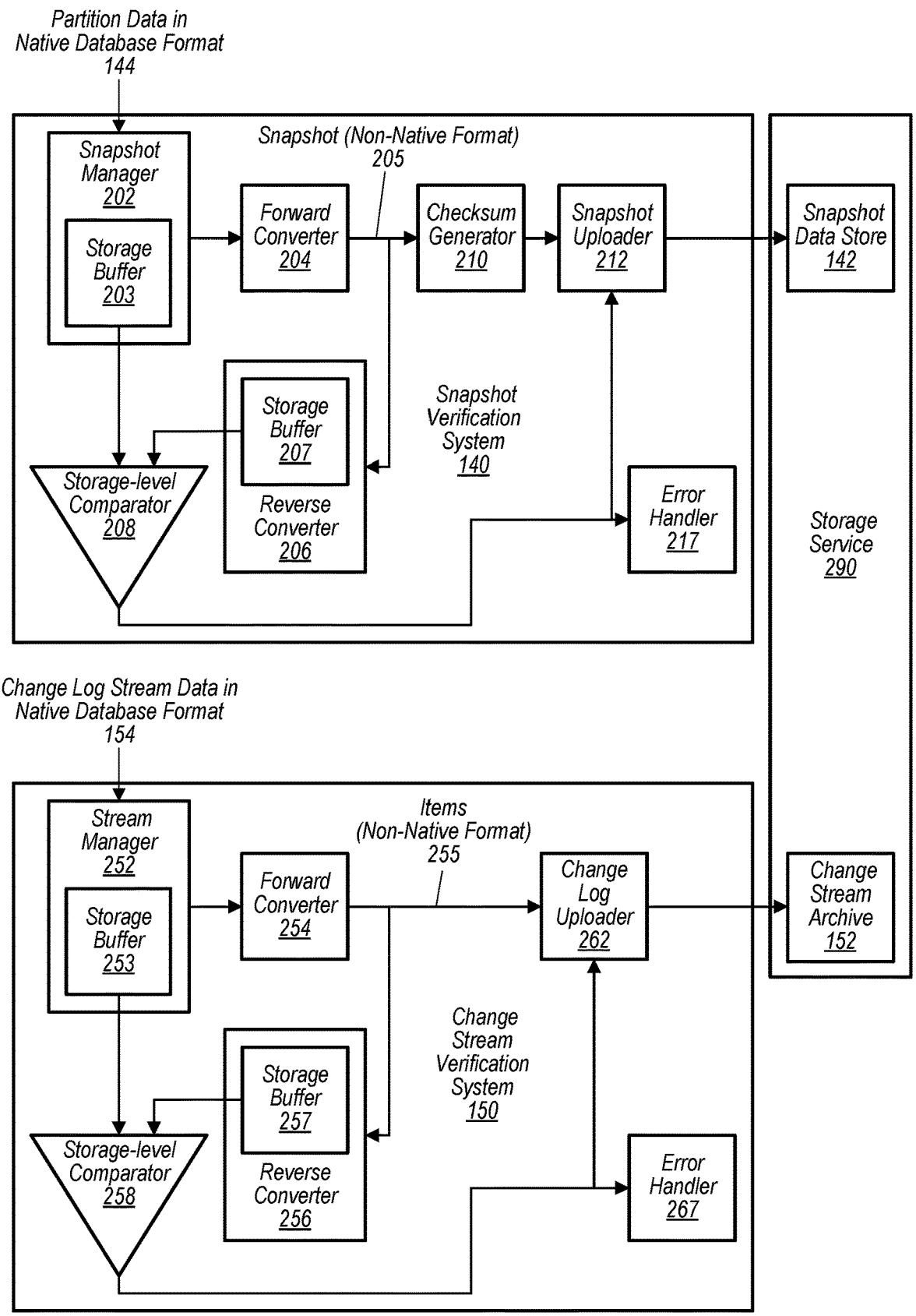
FIG. 2 is a data flow diagram illustrating a snapshot verification system, and a change stream verification system for continuous verified backups, according to some embodiments.

FIG. 2 is a data flow diagram illustrating a snapshot verification system, and a change stream verification system for continuous verified backups, according to some embodiments. The snapshot verification system 140, and a change stream verification system 150 depicted in FIG. 2 illustrate components of similar systems in FIG. 1 that may perform one or more of the steps illustrated in FIGS. 3-5, in embodiments. Different components (e.g., illustrated or non-illustrated components) may perform various of the steps, in various embodiments, without departing from the scope of this disclosure.

FIG. 3 is a flow chart illustrating two techniques used for a process of continuous verified backups, according to some embodiments. the left side of FIG. 3 illustrates a process particular to a change log stream associated with a snapshot of a database and the right side of FIG. 3 illustrates a process particular to the snapshot associated with the change log stream. In some embodiments, the change log stream process on the left is a continuous or near-continuous process that processes batches of items of change data as the change data is created and the partition snapshot process on the right is a non-continuous process that may be requested on-demand, or may be scheduled, or is otherwise periodic.

In at least the illustrated embodiment, snapshot manager 202 receives partition data 144 in a format native to the database, for example, obtaining a full partition snapshot in a native database format (block 322). The snapshot manager 202 may store a copy of the partition data (e.g., from a replica) in a format native to the database in storage buffer 203. Forward converter 204 may convert the partition data into a snapshot in a non-native format 205, for example, forward converting each item of the full partition snapshot to a non-native format (block 323).

The conversion process may include forward transforming the replica from the native format into an intermediate object (e.g., an intermediate JAVA based record) to represent the data in-memory (an in-memory representation) before continuing to transform the logical record to the non-native format, in some embodiments. The conversion process may include de-serializing the data from the replica into the in-memory data, in embodiments. Reverse-conversion may include de-serializing the data into in-memory data before converting the in-memory date into the native format of the database and serializing the result to recreate the replica, in embodiments.

In embodiments, a non-native format may be a format that provides dual-format interoperability (e.g., applications can seamlessly consume the data in either its text or binary forms without loss of data fidelity) which enables users to take advantage of the ease of use of a text format while capitalizing on the efficiency of a binary format. For example, some forms of dual-format interoperability make the text form easy to prototype, test, and debug, while the binary format saves space and parsing effort.

A non-native format may include a rich type system, e.g., extending JSON's type system, adding support for types suitable for a wider variety of uses, including precision-sensitive applications and portability across languages and runtimes, in some embodiments. In addition to strings, Booleans, arrays (e.g., lists), objects (e.g., structs), and nulls, the non-native format may add support for arbitrary-precision timestamps, embedded binary values, and symbolic expressions. Some embodiments of a non-native format may expand JSON's number specifications by defining distinct types for arbitrary-size integers, IEEE-754 binary floating-point numbers, and infinite-precision decimals.

In some embodiments, a non-native format is a self-describing format, giving it's readers and writers the flexibility to exchange data without needing to agree on a schema in advance. For example, in some embodiments, a self-describing format may not require external metadata (i.e. a schema) in order to interpret the structural characteristics of data denoted by the format. For example, the payloads of the self-describing format may be free from build-time binding that inhibits independent innovation and evolution across service boundaries (data may be sparsely encoded and the implicit schema may be changed without explicit renegotiation of the schema among all consumers).

Continuing with FIG. 2, reverse converter 206 reverse converts the converted snapshot in the non-native format to generate a reverse-converted snapshot (e.g., block 324) and stores the result in storage buffer 207, in at least the illustrated embodiment. The storage-level comparator 208 is illustrated as receiving the original native format partition data from storage buffer 203 of the snapshot manager 202 and comparing it to the reverse-converted snapshot stored in storage buffer 257 of reverse-converter 256 (e.g., block 325). If the compared data does not match (block 327, no) an error handler is invoked (block 328).

For example, error handler 217 may trigger any of various error routines such as retrying the conversion/reverse-conversion process, retrying the process using a different partition replica, retrying the process on different host machine, reporting failure, flagging the error and continuing, etc.).

If the compared data does match (block 327, yes) the snapshot uploader 212 may be triggered to store the snapshot (in the non-native format) to snapshot data store 142 (e.g., block 329). In at least the illustrated embodiments, a checksum generator 210 may generate a checksum on the snapshot in the non-native format prior to upload (e.g., block 326). In embodiments, the uploaded data may also be processed with a streaming checksum. In some embodiments, the checksum is performed after the upload is complete. The checksum may help protect integrity of the overall transformation while uploading the output preferred file to storage, in embodiments. Some such features are useful when the entire data set cannot fit into memory (e.g., partitions).

The change stream verification system 150 in FIG. 2 illustrates that change log stream data (e.g., 154) may be received (e.g., block 302) in a native format of the database by stream manager 252. The stream manager 252 may store the change stream data in the native format of the database to storage buffer 253, in embodiments. Forward converter 254 may forward-convert each change item from the change log to a non-native format (e.g., block 303), and output the result (e.g., non-native format items 255), and reverse converter 256 may reverse-convert the output of the forward converter 254 from the non-native format back to the native format (block 304) and store the result in storage buffer 257.

Storage-level comparator 258 is illustrated as comparing (e.g., block 305) the original change log item in the native format (e.g., from storage buffer 253) to the reverse-converted change log item in native format (e.g., from storage buffer 257). The comparison may be performed at a data storage level, in embodiments. In some embodiments, the comparison may be a raw-byte comparison of the on-disk bytes. In some embodiments, the comparison may require an exact batch of the raw-bytes. Less-strict comparison may be used, in some embodiments. If the comparison does not result in a match (e.g., 306, no), an error handler 267 may be invoked (block 307). The change stream verification system 150 error handler 267 may execute any of a number of various error handling processes, such as retrying the conversion on the same host, retrying the conversion on different host machine, reporting a failure, flagging and encoding error and continuing, etc. If the comparison results in a match (block 306, yes) a change log uploader 262 may archive the change log in the non-native format (e.g., block 308), for example, archiving the change log to the change stream archive 152.

FIG. 4 is a flow chart illustrating a technique for continuous verified backups (e.g., for data in a database) according to some embodiments. The steps illustrated in FIG. 4 may be performed may various components of the systems described herein (e.g., components in snapshot verification system 140), or by components not illustrated herein, in some embodiments without departing from the scope of this disclosure.

Partition data (e.g., 144) is obtained in a storage format native to the database (block 402), and the partition data is read into memory (e.g., by forward converter 204) transforming the data to an in-memory format (block 404). A forward conversion process may be applied to convert the in-memory partition data no a non-native format for the snapshot (block 406), by the forward converter 204, for example. A checksum may be generated for the snapshot (block 408) by the checksum generator 210, for example.

At block 410, a reverse-conversion process may be applied (e.g., by the reverse converter 206) to convert the snapshot data from the non-native format (e.g., a logical format) to the in-memory format, and at block 412 the in-memory format may be transformed to the native database storage format to recreate the partition data in the native format (e.g., by the reverse converter 206).

A storage-level comparison of the recreated partition data to the original partition data in native database storage format may be performed (block 414), by storage level comparator 208, for example. When these is not a match (block 416, no) a snapshot error handler (e.g., 217) may be invoked (block 418). For example, error handler 217 may trigger any of various error routines such as retrying the conversion/reverse-conversion process, retrying the process using a different partition replica, retrying the process on different host machine, reporting failure, flagging the error and continuing, etc.).

Where a match is determined (block 416, yes) the checksum and the non-native format (e.g., logical format) snapshot of the partition may be sent (block 420) to the snapshot data store (e.g., data store 142). In some embodiments, the system may send the snapshot without the checksum.

The recipient of the snapshot (e.g., snapshot data store 142) may use the checksum to verify whether the snapshot has been received without error and send a message back to the snapshot verification system 140 indicating success or not. For example, at block 422, the snapshot uploader 212 receives back the checksum conformation, and (block 422, no) invokes a checksum error handler (block 424) or reports a successful snapshot (block 426). The checksum error handler may perform any of various handling processes, such as retrying the transmission of the snapshot, encoding the failure, reporting the failure and continuing, etc. The system may respond to a successful checksum by marking the process successful, in embodiments.

FIG. 5 is a flow chart illustrating a technique for continuous verified backup (for a change log corresponding to the database data) according to some embodiments. The steps illustrated in FIG. 5 may be performed by one or more of the components of the change stream verification system 150, as an example.

At block 502, change log data (e.g., 154) for a database partition is retrieved in a database storage format that is native to the database (e.g., by stream manager 252). The change log data may be stored in storage buffer 253 in the native format. The change log data is transformed (block 504) to an in-memory (e.g. a programming language) format in memory, and a forward conversion process is applied (block 506) to the transformed change log data to convert the in-memory change log data to a non-native format for archive (e.g., by forward converter 254). At block 508, a reverse-conversion process is applied to convert the change log archive data from the non-native (e.g., logical) format to an in-memory format (e.g., by reverse converter 256). The in-memory change log archive data is transformed (block 510) to native database storage format to recreate change log data at the database item level (e.g., by reverse converter 256). The recreated change log data in the native format may be stored in storage buffer 257, in embodiments.

At block 512, a storage-level comparison of the recreated change log data to the original change log data in the native database storage format may be performed (e.g., by storage-level comparator 258). If the comparison does not result in a match (block 514, no) a change log data error handler (e.g., 267) may be invoked (block 516) and may perform any of various error handling processes. For comparisons that find a match (e.g., 514, yes) the change log archive data may be transmitted to the change stream archive 152 for storage (block 518).

Figure 6:
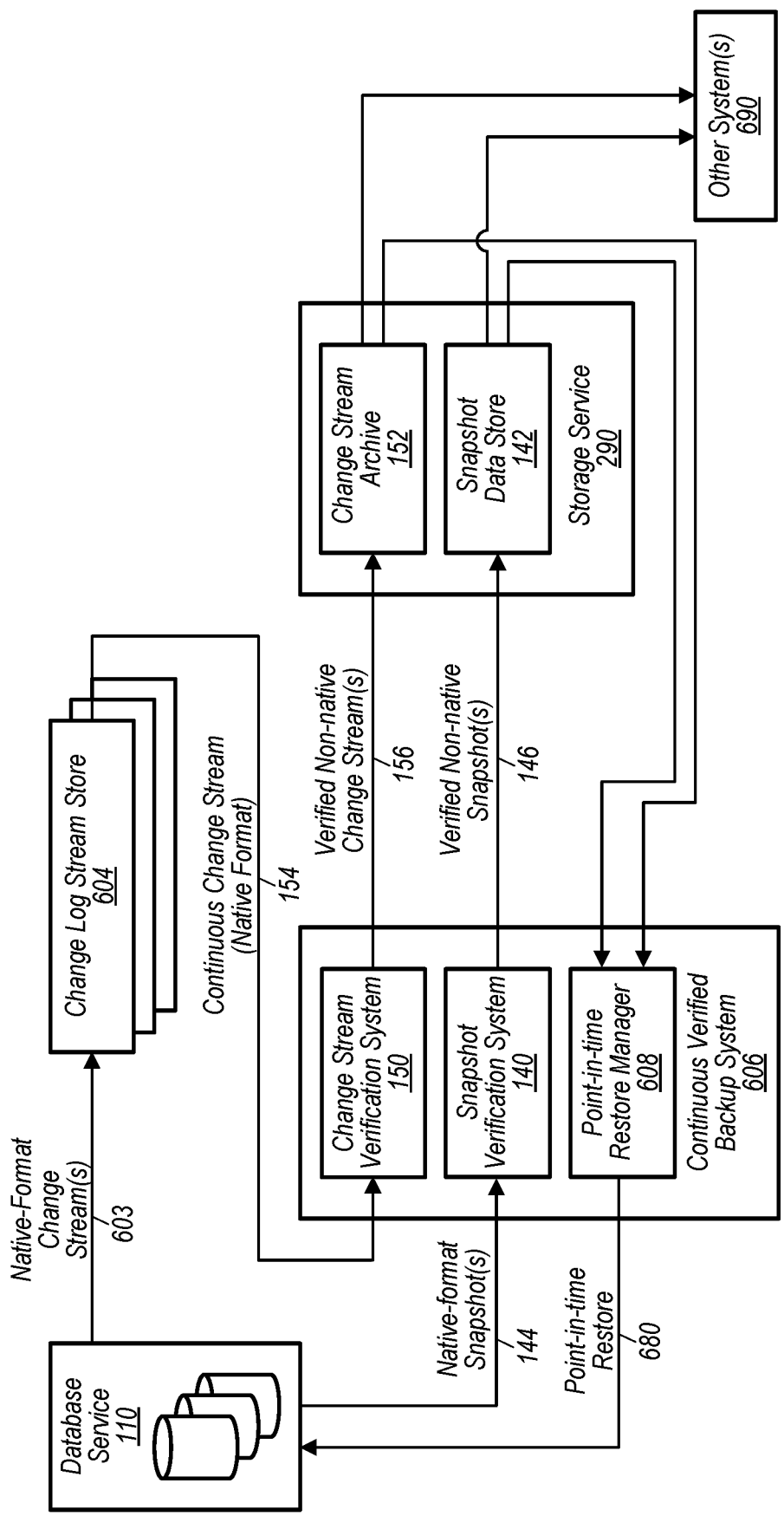
FIG. 6 is a data flow diagram illustrating a continuous verified backup system with a point-in-time restore manager, according to some embodiments.

FIG. 6 is a data flow diagram illustrating a continuous verified backup system 606 with a point-in-time restore manager, according to some embodiments. The illustrated embodiment may be performed by at least by various components in the systems depicted in FIGS. 1, 2, 7 and 8. In at least the illustrated embodiment, change stream verification system 150 receives change stream data in a native format of a database from a change stream log store 604 that receives change streams 603 in a native format of a database from database service 110. Snapshot verification system 140 obtains native format snapshots 144 from database service 110. Both verification systems 140, 150 transmit respective verified data to respective data stores of storage service 290.

The continuous verified backup system 606 in FIG. 6 is illustrated with point-in-time restore manager 608 that may obtain and process the verified non-native change stream data and corresponding verified non-native snapshot from the storage service 290 to generate point-in-time restores 680 in database service 110. In some embodiments, the verified non-native change stream data and corresponding verified non-native snapshot from the storage service 290 may be obtained by other systems 690. For example, a client may use the data in a proprietary system of the client, or a client may export the data from the storage service 290 to another service provider for processing, etc.

Figure 7:
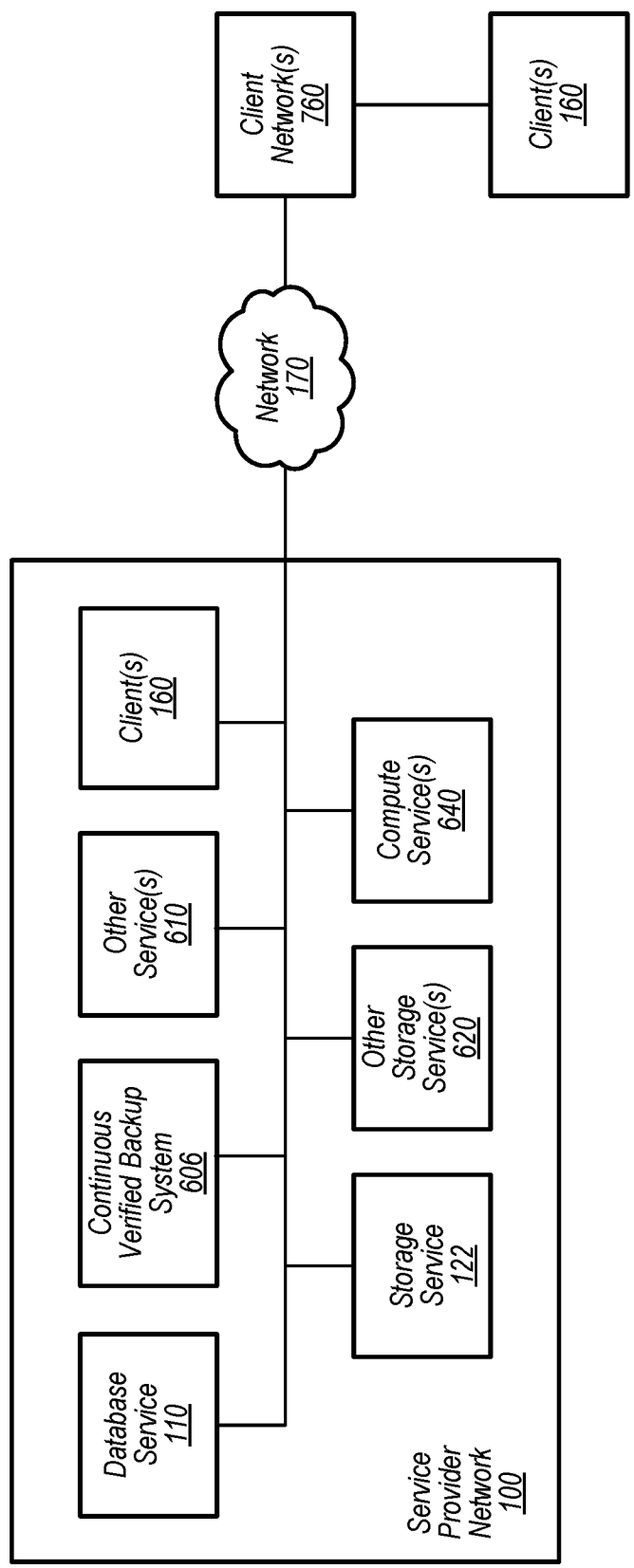
FIG. 7 is a block diagram illustrating a service provider network that implements a continuous verified backup system, according to some embodiments.

FIG. 7 is a block diagram illustrating a service provider network that implements a continuous verified backup system, according to some embodiments. Depicted is a continuous verified back system 606 similar to those illustrated in FIGS. 1, 2, and 6 that may perform some of the steps illustrated in FIGS. 3-5. The continuous verified backup system 606 is illustrated as part of service provider network 100 that includes database service 110, storage service 122, computer service 640, clients 160 as well as other storage services 620 and other services 610. In at least the illustrate embodiment, the service provider network 100 is communicatively coupled to client networks 760 and clients 160 via network 170. Service provider network 100 may provide one or more services to a plurality of distinct customers, each distinct customer comprising a distinct customer network. One or more of the components in FIG. 7 may be implemented by one or more of the computing node 800 illustrated in FIG. 8.

The methods described herein may in various embodiments be implemented by any combination of hardware and software. For example, in one embodiment, the methods may be implemented by a computer system that includes a processor executing program instructions stored on a non-transitory, computer-readable storage medium coupled to the processor. The program instructions may be configured to implement the functionality described herein (e.g., the functionality of various servers and other components that implement the scalable, distributed data storage systems and/or remote key-value durable backup storage systems described herein (or another type of remote storage system suitable for backing up tables and/or partitions thereof).

Figure 8:
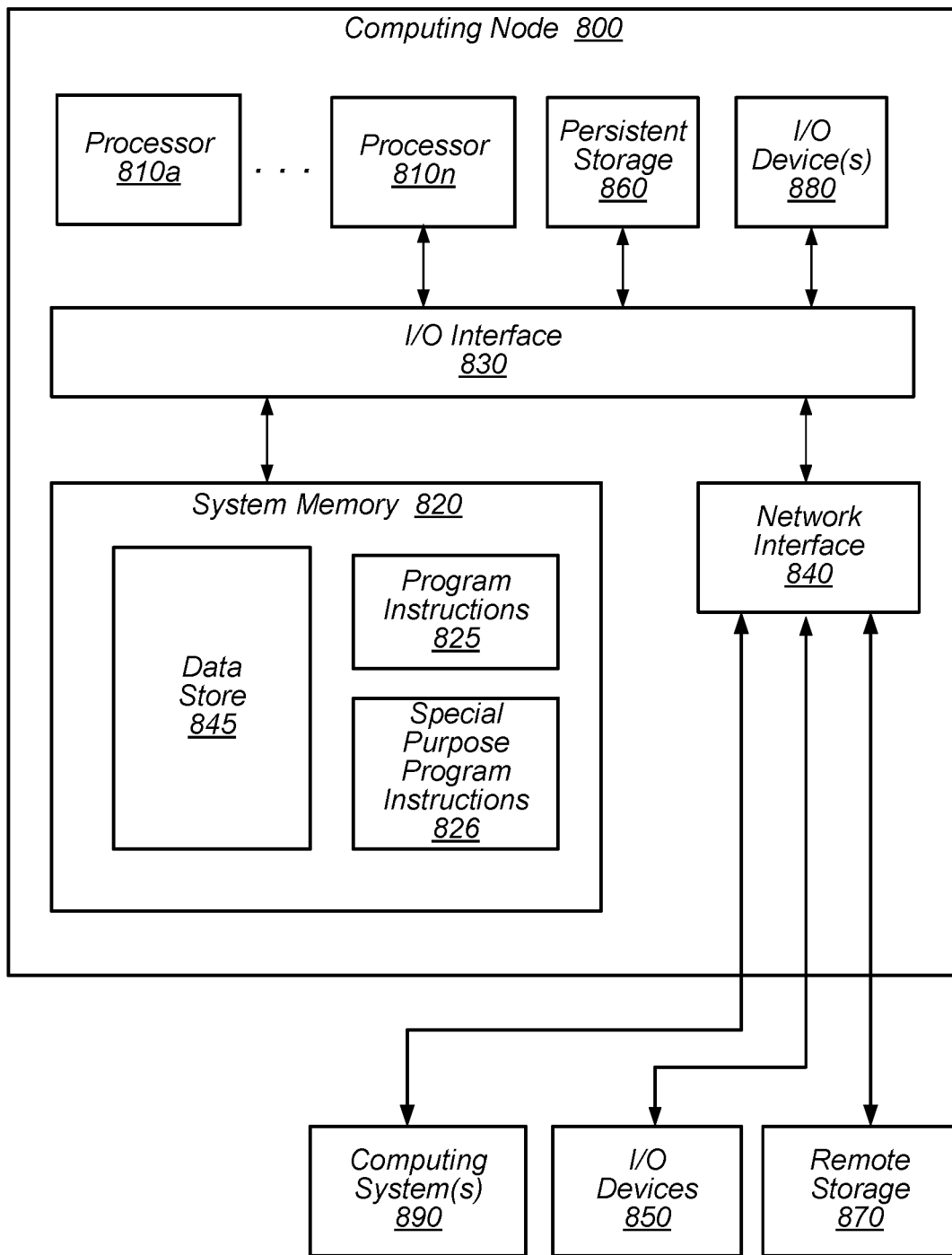
FIG. 8 is a block diagram illustrating a computer system configured to implement at least a portion of a system that includes continuous verified backups, according to various embodiments.

FIG. 8 is a block diagram illustrating a computing node configured to implement at least a portion of continuous verified backups, according to various embodiments. For example, computing node 800 may represent a computing node that implements one or more of the techniques or components described herein for backing up database tables, verifying database tables to be backed up, and/or restoring database tables from a backup, according to various embodiments. In various embodiments, computing node 800 may be configured to implement any or all of the components of a system that implements a scalable, distributed data storage system and a corresponding continuous verified backup system, or multiple computing nodes similar to or different from computing node 800 may collectively provide this functionality. For example, in various embodiments, one or more computing nodes 800 may implement database service 110, snapshot verification system 140, change stream verification system 150, snapshot data store 142, change stream archive 152, point-in-time restore manager 608, continuous verified backup system 606, or clients 160. Additionally, any number of storage node instances may each host one or more replicas of various data partitions 124A-N and/or metadata associated therewith. For example, any given storage node instance may host a replica acting as master replica for its replica group and/or a replica acting as a slave replica in its replica group.

Similarly, one or more computing nodes 800 may implement a key-value durable backup storage system (or an interface or other component thereof), in different embodiments. Computing node 800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

In some embodiments that include multiple computing nodes 800, all of the computing nodes 800 may include the same or similar hardware components, software components, and functionality, while in other embodiments the computing nodes 800 comprising a computing system configured to implement the functionality described herein may include a wide variety of hardware components, software components, and functionality. In some embodiments, multiple computing nodes 600 that collectively implement a data storage service or a remote storage system may be components of a larger shared resource system or grid computing system. It is noted that different elements of the system described herein may be implemented by different computing nodes 800. For example, a computer system that supports the functionality described herein for performing backup and restore operations may be implemented on the same computing nodes 800 on which clients (through which a customer or subscriber may access the system) execute, or on one or more other computing nodes 800, in different embodiments. In another example, different subsystems (e.g., a Web service interface, an admission control subsystem, a service request subsystem; and/or one or more Web servers or other components) may be implemented on or across multiple ones of the computing nodes, and each of the computing nodes may be similar to computing node 800.

In the illustrated embodiment, computing node 800 includes one or more processors 810 (any of which may include multiple cores, which may be single or multi-threaded) coupled to a system memory 820 via an input/output (I/O) interface 830.

Computing node 800 further includes a network interface 840 coupled to I/O interface 830. In various embodiments, computing node 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. Similarly, in a distributed computing system such as one that collectively implements a scalable database service or a remote storage service in which tables are baked up, each of the computing nodes may implement the same ISA, or individual computing nodes and/or replica groups of nodes may implement different ISAs.

The computing node 800 also includes one or more network communication devices (e.g., network interface 840) for communicating with other systems and/or components over a communications network (e.g. Internet, LAN, etc.). For example, a client application executing on computing node 800 may use network interface 840 to communicate with a server application executing on a single server or on a cluster of servers that implement a distributed system. In another example, an instance of a server application executing on computing node 800 may use network interface 840 to communicate with other instances of the server application that may be implemented on other computer systems.

In the illustrated embodiment, computing node 800 also includes one or more persistent storage devices 860 and/or one or more I/O devices 880. In various embodiments, persistent storage devices 860 may correspond to disk drives, tape drives, solid state memory, other mass storage devices, or any other persistent storage device. Computing node 800 (or a distributed application or operating system operating thereon) may store instructions and/or data in persistent storage devices 860, as desired, and may retrieve the stored instruction and/or data as needed.

Computing node 800 includes one or more system memories 820 that are configured to store instructions and/or data (shown as program instructions 825 and data store 845, respectively) that are accessible by processor(s) 810. In various embodiments, system memories 820 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement the methods and techniques described herein.

In the illustrated embodiment, program instructions and data implementing desired functions, methods or techniques (such as functionality for backing up tables, verifying backup objects and/or restoring tables from backup using any or all of the mechanisms described herein), are shown stored within system memory 820 as program instructions 825. For example, program instruction 825 may include program instructions that when executed on processor(s) 810 implement any or all of a continuous verified back up system 606, storage system 122, snapshot verification system 140, change stream verification system 150, various data stores and archives, and/or any other components, modules, or sub-modules of a system that provides the data storage system and services described herein. Program instructions 825 may also include program instructions configured to implement additional functionality of a system that implements a data storage service not described herein. In some embodiments, program instructions 825 may include program instructions configured to implement functionality of a key-value durable backup storage system or another type of remote storage system suitable for backing up tables and/or partitions thereof. In some embodiments, program instructions 825 may implement multiple separate clients, server nodes, and/or other components.

It is noted that in some embodiments, program instructions 825 may include instructions and data implementing desired functions that are not directly executable by processor(s) 810 but are represented or encoded in an abstract form that is translatable to instructions that are directly executable by processor(s) 810. For example, program instructions 825 may include instructions specified in an ISA that may be emulated by processor 810, or by other program instructions 825 executable on processor(s) 810. Alternatively, program instructions 825 may include instructions, procedures or statements implemented in an abstract programming language that may be compiled or interpreted in the course of execution. As non-limiting examples, program instructions 825 may be encoded in platform native binary, any interpreted language such as Java™ byte-code, or may include code specified in a procedural or object-oriented programming language such as C or C++, a scripting language such as perl, a markup language such as HTML or XML, or any other suitable language or in any combination of languages.

In some embodiments, program instructions 825 may include instructions executable to implement an operating system (not shown), which may be any of various operating systems, such as UNIX, LINUX, Solaris™, MacOS™, Windows™, etc. Any or all of program instructions 825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computing node 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing node 800 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In other embodiments, program instructions and/or data as described herein for implementing a data storage service that employs the techniques described above may be received, sent or stored upon different types of computer-readable media or on similar media separate from system memory 820 or computing node 800. Program instructions and data stored on a computer-readable storage medium may be transmitted to a computing node 800 for execution by a processor 810 by transmission media or signals such as electrical, electromagnetic, or digital signals, which may be conveyed via a communication medium such as a network and/or a wireless link, such as may be implemented via network interface 840. In some embodiments, system memory 820 may include data in data store 845 and/or program instructions 825 and/or special purpose instructions 826, which may be configured as described herein. In some embodiments, data store 845 may store the snapshots, or the change stream items, for example. In some embodiments, special purpose program instructions 826 may include instructions that implement either of the verification systems described herein, the continuous verified backup system 606, or the database service 110, for example.

In some embodiments, system memory 820 may include data store 845, which may be configured as described herein. For example, the information described herein as being stored by the scalable, distributed data storage system (e.g., table data, metadata for tables, partitions and backups, transaction information, configuration information for tables and/or partitions, or other information used in performing the methods described herein may be stored in data store 845 or in another portion of system memory 820 on one or more nodes, in persistent storage 860, and/or in remote storage 870, in various embodiments. In some embodiments, and at various times, system memory 820 (e.g., data store 845 within system memory 820), persistent storage 860, and/or remote storage 870 may store copies of table data (e.g., partition data) backup copies of table and/or partition data, metadata associated with tables, partitions, backups, transactions and/or their states, database configuration information, and/or any other information usable in implementing the methods and techniques described herein. In some embodiments, remote storage 870 may be a key-value durable storage system in which tables (and/or partitions thereof) are backed up and from which they are restored, as described herein.

Data store 845 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource capacity data, resource usage data, provisioned resource utilization data, reserved resource data, resource reservation IDs, resource reservation timeout period values, parameter values for various partition management policies, limits, or constraints, and/or information about candidate partition management operations).

In one embodiment, I/O interface 830 may be configured to coordinate I/O traffic between processor(s) 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computing node 800 and other devices attached to a network, such as other computer systems 890 (which may implement one or more server nodes and/or clients of a scalable, distributed data storage system and/or a remote key-value durable storage system), for example. In addition, network interface 840 may be configured to allow communication between computing node 800 and various I/O devices 850 and/or remote storage 870), or between other nodes in a system providing shared computing services. In general, network interface 840 may be configured to allow data to be exchanged between computing node 800 and any of a variety of communication devices, external storage devices, input/output devices and/or or other computing devices, in different embodiments.

Input/output devices 850 may, in some embodiments, include one or more display terminals, keyboards, keypads, touchpads, scanning devices, voice or optical recognition devices, or any other devices suitable for entering or retrieving data by one or more computing nodes 800. Multiple input/output devices 850 may be present in computing node 800 or may be distributed on various nodes of a distributed system that includes computing node 800. In some embodiments, similar input/output devices may be separate from computing node 800 and may interact with one or more nodes of a distributed system that includes computing node 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computing node 800 may include more, fewer, or different components than those illustrated in FIG. 8 (e.g., displays, video cards, audio cards, peripheral devices, other network interfaces such as an ATM interface, an Ethernet interface, a Frame Relay interface, etc.)

Storage service clients (e.g., users, subscribers and/or client applications) may interact with a data storage service such as that described herein in various ways in different embodiments, such as to submit requests for service (including, but not limited to, requests to create and/or partition tables, requests to store, retrieve and/or update items in tables, or requests to split, move, or otherwise repartition a table), and to receive results. For example, some subscribers to the service may have physical access to computing node 800, and if so, may interact with various input/output devices 850 to provide and/or receive information. Alternatively, other clients/users may use client computing systems to access the system, such as remotely via network interface 840 (e.g., via the Internet and/or the World Wide Web). In addition, some or all of the computing nodes of a system providing the service may provide various feedback or other general types of information to clients/users (e.g., in response to user requests) via one or more input/output devices 850.

It is noted that any of the distributed system embodiments described herein, or any of their components, may be implemented as one or more web services. For example, a front-end module or administrative console of a Web services platform may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Those skilled in the art will appreciate that computing node 800 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 800 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 800 may be transmitted to computing node 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the distributed data store is implemented using a different storage paradigm.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied.

The invention claimed is:

1. A system, comprising:
a memory to store program instructions which, if performed by at least one processor, cause the at least one processor to perform a method to at least:
receive a trigger to back up a portion of a database, the database in a native format;
create, in a non-native format, by a forward converter, a snapshot of a replica of the portion of the database;
reverse, by a reverse converter, the snapshot of the replica in the non-native format to a copy of the replica in the native format;
based on identifying, at a data-storage-level, a match of the replica to the copy of the replica, send the snapshot of the replica in the non-native format to a snapshot data store; and
for received items of a change log that corresponds to the portion of the database:
create, by a forward converter, from a native format for the database, an archive of items of the change log in a non-native format;
reverse, by a reverse converter, each item of the archive of items in the non-native format to create respective reversed items in the native format; and
based on identifying a match of the received items of the change log to the respective reversed items, send the archive of items in the non-native format to an archive data store.

2. The system as recited in claim 1, wherein the program instructions cause the at least one processor to perform the method to at least:
generate a checksum for the snapshot of the replica in the non-native format;
receive, from the snapshot data store, indication of a successful verification of the checksum at the snapshot data store; and
responsive to both i) the data-storage-level identification of the match of the replica to the copy of the replica, and ii) receipt of the successful verification of the checksum at the snapshot data store, indicate that the snapshot has been successfully created.

3. The system as recited in claim 1, wherein the program instructions cause the at least one processor to perform the method to at least:
receive a request to restore the portion of the database to a historical point-in-time;
create a new table;
restore, based at least in part on a snapshot of the replica at the snapshot data store and change log items in the archive data store, the portion of the database to the historical point-in-time in the new table; and
mark a table state for the newly-created table as active.

4. The system as recited in claim 1, wherein the system further comprises:
a plurality of storage nodes that implement the database, each of which comprises one or more storage devices or logical storage volumes; and
a distributed database system that maintains data for the database in one or more partitions, and wherein to maintain the data in the one or more partitions, the distributed database system is configured to store two or more replicas of each of the one or more partitions on respective storage devices or logical storage volumes.

5. A method, comprising:
converting a replica of at least a portion of a database from a native format for the database to a non-native format using a forward conversion process to create a snapshot of the replica in the non-native format;
reverse-converting the snapshot of the replica in the non-native format to create a copy of the replica in the native format using a reverse conversion process;
performing a data-storage-level comparison of the replica to the copy of the replica; and
sending the snapshot of the replica in the non-native format to a snapshot data store responsive to the data-storage-level comparison of the replica to the copy of the replica indicating a match.

6. The method as recited in claim 5, further comprising:
generating a checksum for the snapshot of the replica in the non-native format;
sending the checksum to the snapshot data store;
receiving an indication that the checksum was successfully verified at the snapshot data store; and
indicating, responsive to both i) the data-storage-level comparison of the replica to the copy of the replica indicating a match, and ii) the successful verification of the checksum at the snapshot data store, that the snapshot has been successfully created.

7. The method as recited in claim 5, where said converting the replica, said reverse-converting the replica, said data-storage-level comparison of the replica, and said sending the snapshot of the replica to the snapshot data store are performed in response to a client request to create a backup, or in response to a regularly-schedule periodic backup defined by a backup system.

8. The method as recited in claim 5, further comprising:
converting data from a change log for the replica from the native format for the database to the non-native format using a forward conversion process to create data from the change log in the non-native format;
reverse-converting change log data in the non-native format to create a copy of the change log data in the native format using a reverse conversion process;
comparing the data from the change log for the replica in the native format to the copy of the change log data in the native format; and
sending the data from the change log in the non-native format to a change log archive data store responsive to the comparing indicating a match for each item.

9. The method as recited in claim 8,
wherein said converting the replica, said reverse-converting the replica, said data-storage-level comparison of the replica, and said sending the snapshot of the replica to the snapshot data store are performed periodically; and
wherein the change log data is received as items in a stream, and said converting the data from the change log, said reverse converting the change log data, and said comparing the data from the change log, are performed as each change log item is received.

10. The method recited in claim 5, wherein said converting the replica of at least the portion of the database from the native format for the database to the non-native format using the forward conversion process to create the snapshot of the replica in the non-native format comprises:
converting the replica of at least the portion of the database into in-memory items;
serializing the in-memory items to a stream of items in the non-native format; and
creating a copy of the replica by locally storing the streamed items in the non-native format.

11. The method recited in claim 10, wherein said reverse-converting the snapshot of the replica in the non-native format to create a copy of the replica in the native format using a reverse conversion process comprises:
reading locally stored items into in-memory representations; and
reverse converting the in-memory representation of the items to the native format for the database.

12. The method recited in claim 11, wherein said performing the data-storage-level comparison of the replica to the copy of the replica comprises:
comparing raw bytes of the native-format items from the replica to raw bytes of the reverse converted items in the native format.

13. The method recited in claim 8, further comprising:
receiving a request to restore a portion of the database; and
either:
creating a new table,
restoring, based at least in part on a snapshot of the replica stored in the snapshot data store, and change log items from the change log archive data store, the requested portion of the database in the newly-created table, and
marking a table state for the newly-created table as active; or
restoring, based at least in part on a snapshot of the replica stored in the snapshot data store, and change log items from the change log archive data store, the requested portion of the database in the table.

14. The method recited in claim 5, further comprising:
receiving a trigger to make a snapshot of a second portion of the database;
converting a second replica of the second portion of the database from the native format for the database to the non-native format using the forward conversion process to create a snapshot of the second replica in the non-native format;
reverse-converting the second replica of the second replica in the non-native format to a copy of the second replica in the native format using the reverse conversion process;
performing a data-storage-level comparison of the second replica to the copy of the second replica; and
responsive to the data-storage-level comparison of the second replica to the copy of the second replica indicating a mis-match between the second replica to the copy of the second replica,
invoking a snapshot error handler configured to perform:
retrying said converting, said reverse-converting, and said performing the data-storage-level comparison for the second portion of the database using a different partition replica,
retrying said converting, said reverse-converting, and said performing the data-storage-level comparison for the second portion of the database on different host machine,
reporting a failure, or
flagging an error and continuing with creation of the snapshot of the second portion of the database.

15. A non-transitory computer readable storage medium storing program instructions that, when executed by a computer, cause the computer to:
receive change log data corresponding to at least a portion of a database, the data in a native format of the database;
transform the change log data to an in-memory format in system memory;
convert, via a conversion process, the in-memory change log data to produce change log archive data in a non-native format;
reverse-convert, via a reverse-conversion process, the change log archive data from the non-native format to recreate the change log data at a database item-level;
perform a storage-level comparison of the recreated change log data to the change log data in the native format of the database; and
based at least in part on a determination whether the storage-level comparison verifies that the recreated change log data matches the change log data in the native format of the database,
store the change log archive data to a change log archive data store, or invoke a change log error handler.

16. The non-transitory computer readable storage medium as in claim 15, wherein to perform said reverse-convert the change log archive data from the non-native format to recreate the change log data at the database item-level, the program instructions, when executed by the computer, further cause the computer to:
    reverse-convert the change log archive data from the non-native format to in-memory data in the in-memory format; and
    transform the in-memory data to the native database storage format to recreate the change log data at the database item-level.

17. The non-transitory computer readable storage medium as in claim 15,
    wherein to determine whether the storage-level comparison verifies that the recreated change log data matches the change log data in the native format of the database, the program instructions, when executed by the computer, further cause the computer to:
        compare a serialized persistent data storage format of the recreated change log data to raw bytes of the change log data in the native format of the database; and
    wherein to store the change log archive data to the change log archive data store, or invoke the change log error handler, the program instructions, when executed by the computer, further cause the computer to:
        for a comparison that identifies an exact match,
            store the change log archive data to the change log archive data store; and
        for a comparison that identifies a mismatch,
            invoke the change log error handler.

18. The non-transitory computer readable storage medium as in claim 15, where the program instructions, when executed by the computer, further cause the computer to:
    convert a replica of at least a portion of the database from a native format for the database to a non-native format using a forward conversion process to create a snapshot of the replica in the non-native format;
    reverse-convert the snapshot of the replica in the non-native format to a copy of the replica in the native format using a reverse conversion process;
    perform a data-storage-level comparison of the replica to the copy of the replica; and
    responsive to the data-storage-level comparison of the replica to the copy of the replica indicating a match, send the snapshot of the replica in the non-native format to a snapshot data store.

19. The non-transitory computer readable storage medium as in claim 15, where the program instructions, when executed by the computer, further cause the computer to:
    receive a request to restore the portion of the database;
    create a new table;
    restore, based at least in part on items from the archive data store, the portion of the database in the newly-created table; and
    mark a table state for the newly-created table as active.

20. The non-transitory computer readable storage medium as in claim 15, wherein subsequent to the program instructions causing the computer invoke the change log error handler, the program instructions, when executed by the computer, further cause the computer to:
    retry said transform, said convert, said reverse convert, and said perform the storage-level comparison;
    report a failure; or
    encode and flag an encoding error.

* * * * *